Sept. 21, 1948.  E. S. PRIDHAM  2,449,952
METHOD OF MANUFACTURING CONDENSERS
Filed Dec. 26, 1942  2 Sheets-Sheet 1
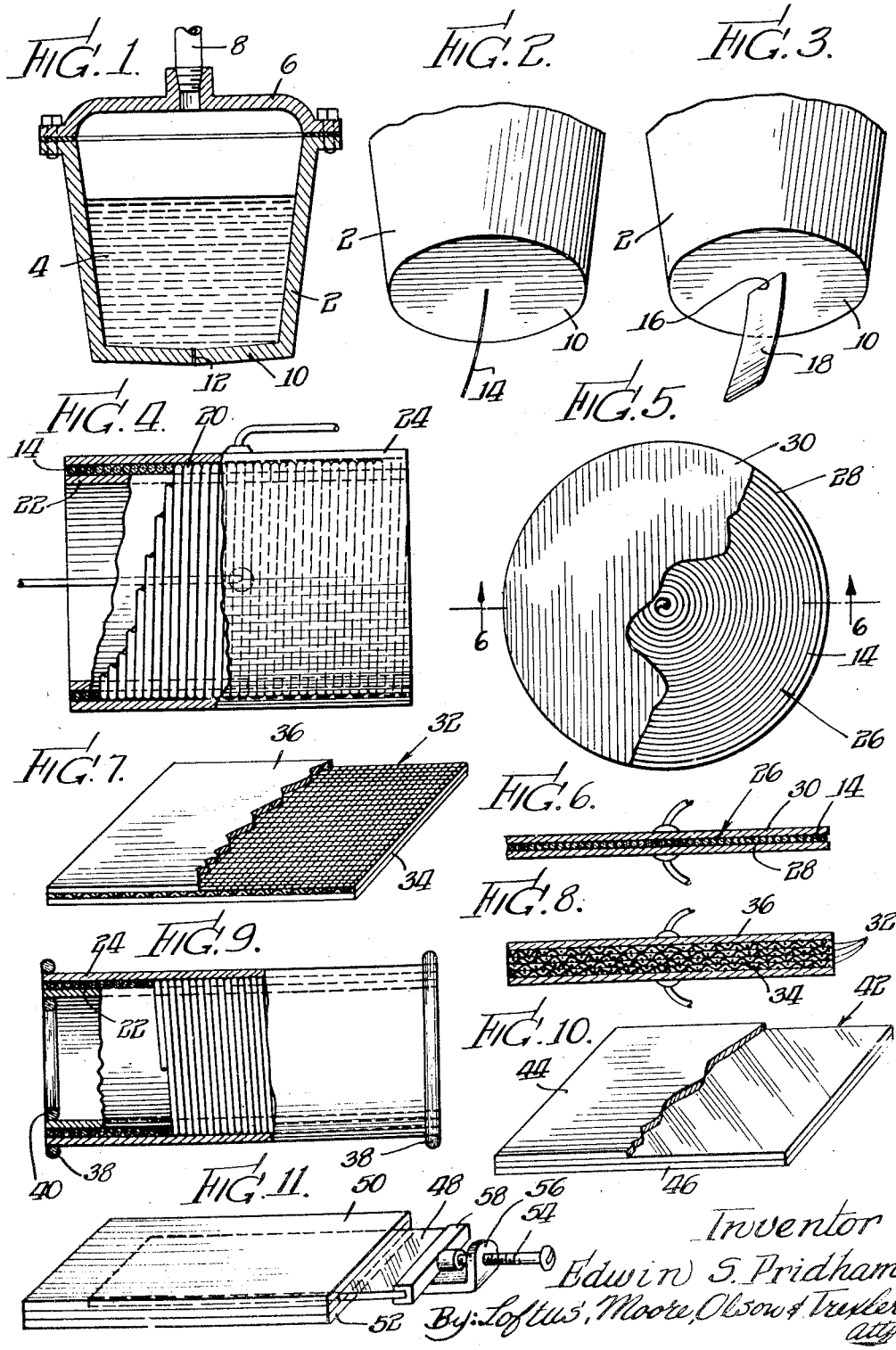
Inventor
Edwin S. Pridham
By: Loftus, Moore, Olson & Trexler
attys.

Sept. 21, 1948.  E. S. PRIDHAM  2,449,952
METHOD OF MANUFACTURING CONDENSERS
Filed Dec. 26, 1942  2 Sheets-Sheet 2

INVENTOR.
Edwin S. Pridham
By: Loftus, Moore, Olson & Trexler
attys.

Patented Sept. 21, 1948

2,449,952

UNITED STATES PATENT OFFICE 2,449,952

METHOD OF MANUFACTURING CONDENSERS

Edwin S. Pridham, Oakland, Calif., assignor to The Magnavox Company, Fort Wayne, Ind., a corporation of Delaware Application December 26, 1942, Serial No. 470,184

8 Claims. (Cl. 49—81)

This invention relates to capacitors, and more particularly to condensers of the static type.

A further object of the invention is to provide a method of making a condenser by means of which it can be made to a determined capacity and voltage rating in mass production.

Other and further objects and advantages of the invention will be apparent from the following description when taken in connection with the accompanying drawings, wherein—

Figures 1 to 3, inclusive, are diagrammatic views of apparatus for making dielectric filaments or sheets for the purposes of this invention;

Figure 4 is a view in elevation, partly broken away, of a condenser embodying the invention;

Figure 5 is a plan view, partly broken away, of another form of condenser embodying the invention;

Figure 6 is a view in vertical section taken substantially along the line 6—6 of Figure 5;

Figure 7 is a perspective view, partly broken away, of another form of condenser embodying the invention;

Figure 8 is a view, in vertical section, of a modification of the condenser shown in Figure 7;

Figure 9 is a view, partly broken away, of a modification of the condenser shown in Figure 5;

Figure 10 is a perspective view, partly broken away, of another form of condenser embodying the invention;

Figure 11 is a perspective view of one form of variable condenser embodying the invention;

Figure 12:
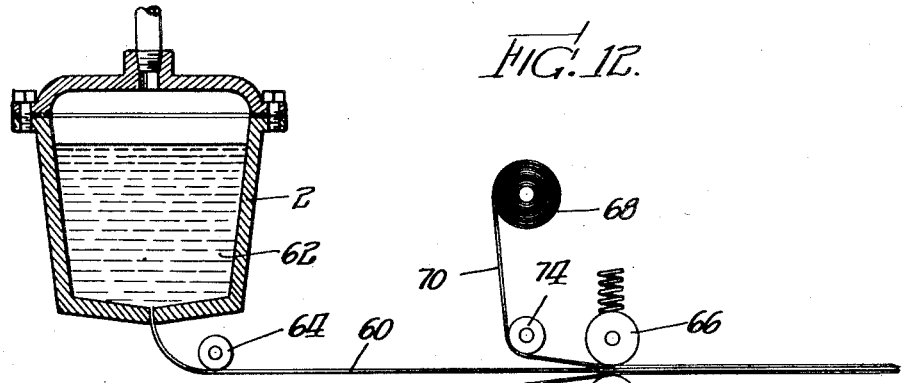
Figures 12 and 13 are diagrammatic views of other apparatus for making condensers, according to this invention.

A static condenser, as is well known, comprises collector plates or electrodes separated by a dielectric, the characteristics of which determine the capacity and dielectric strength of the condenser.

The ratio of the capacity of a condenser, with a given substance as a dielectric to the capacity of the same condenser with air as the dielectric, is the specific inductive capacity or dielectric constant of the condenser.

The capacity of the dielectric to resist breakdown is known as the dielectric strength.

Two factors of major importance in any condenser are the dielectric constant and the dielectric strength, for as the dielectric constant decreases the area of the condenser must be increased to obtain the same capacity, and as the dielectric strength decreases, the thickness of the dielectric must be increased to maintain the same voltage rating. As the dielectric constant increases, it becomes more and more difficult in manufacturing condensers to obtain uniformity in capacity, for relatively slight differences in the sizes of the condensers cause large variations in the capacity.

Dielectric resistance of a condenser is the resistance of the dielectric to the passage of current through the condenser and determines the power loss in the condenser.

Electrolytic condensers have an advantageous ratio of size to capacity in comparison with known static condensers, but static condensers in contradistinction to electrolytic condensers have high dielectric resistance values for both positive and negative voltages, and therefore are of great value in alternating current circuits for power factor correction, as well as filter circuits, in which electrolytic condensers cannot be used.

Since the dielectric constant is so important, many attempts have been made to improve the dielectric materials with respect to this factor. The dielectrics principally used today are paraffin paper, mica and chlorinated oils. Paraffin paper has a dielectric constant of 2.10; mica has a dielectric constant of from 5 to 6; and chlorinated oils have a dielectric constant of from 2.2 to 15.

Mica has a high dielectric resistance, a high melting point, and an advantageous dielectric constant, so that it has been so far the only dielectric used in condensers of very high voltage rating. Mica is, however, expensive and very difficult to obtain, and its use in condensers for many purposes is, therefore, prohibitive.

Chlorinated oils are satisfactory for medium high voltages, but have a tendency toward electrolytic dissociation which causes loss of power. Paper condensers, including those which are paraffin-coated, are only practical for small capacities in by-pass filters and telephone condensers because of their unfavorable size to capacity rating.

Recently it has been discovered that titanium dioxide when fused as a frit to form an enamel on the conductor has a high melting point, a high dielectric constant, and a high dielectric strength. It has, however, been found that the firing of the frit and the heat treatment is most difficult and hard to control. Applicant has discovered that titanium dioxide, which is an abundant commodity and can be had in the purest form, can be worked and shaped in such form that it becomes a simple problem to make a static condenser to a determined capacity and voltage rating with a size to capacity ratio far in excess of anything previously known, and at the same time can be so controlled in both area and thickness of the dielectric that high uniformity in capacity may be maintained in manufacture by mass production.

In Figures 1 and 2 of the drawings there is shown a melting pot 2 partially filled with a melt 4 of titanium dioxide, or, since titanium dioxide has a very high melting point, a melt of titanium dioxide with flux, such as borax or other metal oxides, preferably alkaline, earth metal oxides or oxides of certain elements of group IV of the periodic table, such as lead or tin, to form titanates more easily workable at lower temperatures.

This melting pot 2 is provided with a cover 6, to which is connected a conduit or pipe 8 for supplying air under pressure thereto above the melt. The bottom 10 of the melting pot may be provided with a fine opening 12, through which the material of the melt is forced by the air under pressure and drawn or spun to form the filament 14.

As shown in Figure 3, the melting pot 2 is provided in its bottom 10 with a narrow or fine slit 16, so that the air under pressure in forcing the material of the melt outwardly from the pot through the slit 16 forms a thin sheet 18. As shown in the drawings, condensers can be formed from the filament 14 in a number of ways. Thus, as shown in Figure 4, a condenser can be formed as a coil 20 by winding a determined length of the filament in abutting convolutions on a metal cylinder or electrode 22, to which electrical connection has been previously established as at the longitudinally central radial plane. The determined length of filament having been wound upon the cylinder 20, the opposing electrode or cylinder 24 may be slipped over the filament winding and electrical connection established thereto as convenient, and, for example, as at the longitudinally central radial plane thereof.

As shown in Figures 5 and 6, a determined length of the filament 14 may be wound as a spiral 26 on a circular, flat metal plate, disc, or electrode 28. An opposing electrode 30 of like form is positioned on the opposite side of the spiral 26.

As shown in Figure 7, the filament 14 may be formed into a fabricated cloth 32 woven or fabricated by any known method or apparatus, providing a very close weave or texture, the cloth being interposed between opposed collecting plates or electrodes 34 and 36, preferably flat plates, but which may be of any desired shape such that the cloth may conform thereto.

As shown in Figure 8, the condenser may comprise plates or electrodes 34 and 36, between which is interposed any desired number of multiplicity of thin sheets of cloth 32, stacked one upon another.

It will be evident that the condensers of the forms shown in Figures 4, 5, and 6 may also comprise multiple-layer dielectric coils. In condensers made according to this invention, and more particularly when such are used at high voltages, the specific potential stress at the boundary edges of the collector plates or electrodes may be quite high, and cause corona loss above a limiting voltage less than the breakdown voltage of the condenser. In order to minimize this effect, applicant has found it to be of great advantage to considerably increase the area of the boundary edge as compared to the normal cross-sectional area of the electrode to thus reduce the specific potential stress at the boundary edge. This may be effected by affixing to or forming the boundary edge as a toroidal conductor. Thus, for example, as shown in Figure 9, a toroidal conductor or ring may be affixed in any convenient manner to the opposite edges of the outer cylinder or electrode 24, and a like toroidal conductor or ring 40 may be fixed in any convenient manner within the inner cylinder or electrode 22 at its opposite boundary edges. These rings 38 and 40 will, of course, be affixed in electrically contacting relation to their respective electrodes. It will be evident that, as previously indicated, the toroidal conductors or rings 38 and 40 may be formed integrally with the electrodes 24 and 22, respectively.

It will be further evident that the opposing electrodes of the condensers shown in Figures 5 to 8 may also be provided with marginal expanded conductors of substantially greater area in cross-section than the normal area of the electrodes so as to reduce the potential stress between the electrodes at their boundary edges. As shown in Figure 10, the dielectric may be formed from the melt as a sheet 42 in the manner as indicated in Figure 3 and interposed between the collecting plates or electrodes 44 and 46. The dielectric for such type of condenser may be formed of multiple layers of such thin sheets 42.

I have purposely not shown the conventional method of staggering oppositely disposed electrodes to provide free boundary space for the dielectric, as this method is well known in the art; nor have I shown in detail means and methods of producing fine fibers or thin sheets as such means and methods are well known in the art of glass making.

As shown in Figure 11, a portion or all of the dielectric layer may comprise a thin sheet of cloth 48, a discrete portion of which is movable between collecting plates or electrodes 50 and 52 to provide a variable capacity condenser, which may be subject to adjustment for that purpose in any convenient manner, as, for example, by means of an adjusting screw 54 threaded in a bracket 56 and suitably secured as by frame bar 58 to the movable portion of the dielectric sheet or cloth mounted in any convenient manner on such bar.

In making a static condenser, it is necessary to control the area and the thickness of the dielectric as the constants of the dielectric vary. By spinning out the titanium dioxide melt into a thin filament, the dielectric constant of which for each melt can be readily determined, it becomes a simple matter to form a condenser of a determined capacity, even though the dielectric constant of the material is so extremely high that slight variations in the area and thickness of the dielectric effect substantial changes in capacity.

Likewise, by using single or multiple, woven or pressed-out sheets, the constants of which per units of area and thickness can be readily determined, it becomes a simple matter to select the precise area of dielectric material necessary to provide a condenser of the desired determined capacity within very close limits of tolerance.

As before stated, pure titanium dioxide has a quite high melting point and, in order to make it more easily workable at lower temperatures, it may be fused with borax; alkaline, earth metal oxides; or other metal oxides to form titanates. In general, titanates of this class have the properties of high melting point glass with the consistency of fiber glass and conform readily, under the proper working conditions, without breaking, to the cooperating electrodes forming the condenser. These titanates have extremely high dielectric constants, great dielectric strength, and high dielectric resistivity.

These titanates, especially the boro-titanate glasses, formed by fusing the titanium dioxide with borax, have dielectric constants from ten to twelve, or more, times the dielectric constants of the best mica. Condensers made of this fused titanium dioxide or titanates srow remarkably low power factor loss and increased efficiency at low temperatures.

Spun filaments of this material when coiled, or fabricated into sheets, and thin, pressed-out sheets of this material make it possible to provide a condenser which will withstand the mechanical and electrical stresses imposed on the dielectric under high voltage and continuous duty operation much in the same manner that mica because of its cleavage planes is able to withstand high voltages under continuous duty operation.

In manufacturing capacitors of high melting point titanium dioxide or fused titanates, it has been found to be sometimes necessary to work the material into a semi-melted state, in which state the surfaces are in a viscous condition. In this condition these surfaces readily receive and hold applied electrodes on account of metallic dispersion into the viscous surfaces. These closely adhering metal electrodes form highly efficient contact plates, each giving generally a greater area of contact than the superficial area of the dielectric. These plates form with the dielectric a firmly fixed combination of elements of great value in an alternating current capacitor where power factor, heat losses, and mechanical vibration should be at a minimum.

Figure 14:
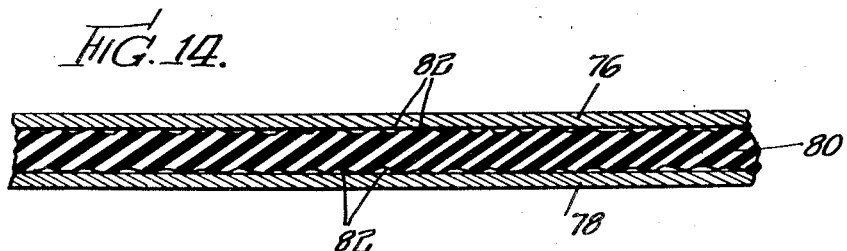
Figure 14 is a view in vertical section of a condenser made by the apparatus of Figures 12 and 13.

As shown in Figure 12, a sheet 60 formed from a melt 62, of titanium dioxide, or titanium dioxide with flux of the character heretofore noted, in the melting pot 2 is drawn from the pot by any suitable, well known feeding apparatus over a directing roller 64 and between spring-pressed pressing rollers 66. From reels 68 sheets of metal foil 70 and 72 are withdrawn by any suitable feeding apparatus (not shown) over directing rollers 74 and between pressing rollers 66 and the opposite surfaces of the dielectric sheet 60 while such surfaces are in a semi-viscous condition. While the surfaces are in this condition the rolled-on electrodes become firmly bound or adhered thereto on account of the dispersion of the metal into the viscous surfaces, as illustrated in Figure 14, wherein the metal of the electrodes 76 and 78 is dispersed into the opposite surfaces of the dielectric layer 80, as indicated by the metal particles 82 embedded in the surface of the dielectric. It will be seen that the area of contact between each electrode and the dielectric is, by this dispersion of the metal particles into the surface of the dielectric, made greater than the superficial or facial area of the dielectric.

Figure 13:
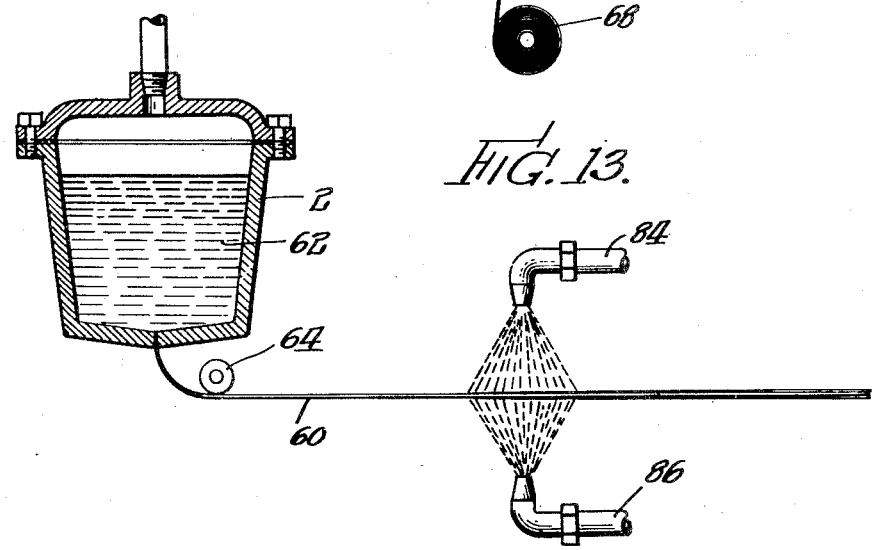

As shown in Figure 13, the dielectric sheet 60, as it is withdrawn from the pot 2, and over the directing roller 64, passes between metal spraying guns 84 and 86 by means of which the metal electrodes, as 76 and 78 in Figure 14, are sprayed onto the opposite surfaces of the dielectric sheet while those surfaces are in a semi-melted or semi-viscous condition and the sprayed-on conducting material disperses into the dielectric, as illustrated in Figure 14.

It should be understood that any method of applying a conducting coating—foil, sheet, or plate—to a hot, semi-viscous surface of a dielectric, so that there will be some dispersion of the conducting material into the dielectric, is within the scope of this invention.

In general the invention employs means and methods of using titanium dioxide and titanates in a manner to fabricate a capacitor of determined capacity having a dielectric with a high dielectric strength of constant K, high resistivity, and great strength against voltage puncture, and having a melting point at least equal to high melting point glasses.

It will be apparent that many widely different embodiments of this invention may be made without departing from the spirit and scope thereof, and, therefore, it is not intended to be limited except as indicated in the appended claims.

What I claim is:

1. The method of making a static condenser which comprises drawing a thin viscous sheet of dielectric material from a melt composed mostly of titanium dioxide, contacting said viscous sheet on either side with conducting electrodes of determined area to form a condenser of definite capacity.

2. The method of making a static condenser which comprises forming a dielectric layer from a melt comprising titanium dioxide, and while a surface of the layer is in a semi-viscous condition applying an electrically conducting metal coating to that surface.

3. The method of making a static condenser which comprises applying to the surface of a layer of a fused titanate while that surface is in a semi-viscous condition a layer of electrically conducting metal.

4. The method of making a static condenser which comprises melting a titanate forming mixture of titanium dioxide and flux, forming a thin dielectric sheet of titanate from the melt, and rolling onto opposite surfaces of said dielectric sheet while said surfaces are in a semi-viscous condition sheets of metal foil to cause the metal of the sheets of metal foil to be dispersed at least partially into the semi-viscous surfaces of the dielectric sheet.

5. The method of making a static condenser which comprises forming a thin dielectric sheet from a melt containing titanium dioxide, and spraying metal onto the opposite surfaces of said sheet while said surfaces are in a semi-viscous condition to provide metal electrodes of which the metal is at least partially dispersed into said surfaces of the dielectric sheet.

6. A method of making a static condenser of definite capacity which comprises forming a thin dielectric sheet from viscous boro-titanate glass material, and rolling on to opposite surfaces of said dielectric sheet while said surfaces are in a semi-viscous condition sheets of metal foil to cause the sheets of metal foil to be dispersed at least partially into the semi-viscous surfaces of the dielectric sheet.

7. A method of making a static condenser of definite capacity which comprises forming a thin dielectric sheet from viscous boro-titanate glass material and rolling on to a surface of said dielectric sheet while said surface is in a semi-viscous condition a sheet of metal foil to cause the sheet of metal foil to be dispersed at least partially into the semi-viscous surface of the dielectric sheet.

8. The method of making a static condenser which comprises forming a thin dielectric sheet from a melt containing titanium dioxide, and spraying metal onto a surface of said sheet while said surface is in a semi-viscous condition to provide a metal electrode of which the metal is at least partially dispersed into said surface of the dielectric sheet.

EDWIN S. PRIDHAM.

REFERENCES CITED

The following references are of record in the file of this patent:

UNITED STATES PATENTS

| Number | Name | Date |
|---|---|---|
| 792,443 | Morwitz | June 13, 1905 |
| 805,963 | Jackson | Nov. 28, 1905 |
| 887,598 | Delloye | May 12, 1908 |
| 893,811 | Pickard | July 21, 1908 |
| 928,224 | Shoemaker | July 13, 1909 |
| 1,362,917 | Barton et al | Dec. 21, 1920 |
| 1,517,370 | Marbury | Dec. 2, 1924 |
| 1,886,236 | Meissner | Nov. 1, 1932 |
| 1,945,917 | Scarpa | Feb. 6, 1934 |
| 1,947,112 | Ruben | Feb. 13, 1934 |
| 1,987,088 | Walter | Jan. 8, 1935 |
| 2,069,903 | Soyck | Feb. 9, 1937 |
| 2,097,073 | Long | Oct. 26, 1937 |
| 2,161,888 | Rearick | June 13, 1939 |
| 2,177,000 | Nash | Oct. 24, 1939 |
| 2,186,442 | Youmans | Jan. 9, 1940 |
| 2,212,231 | Gossel | Aug. 20, 1940 |
| 2,233,622 | Lytle | Mar. 4, 1941 |
| 2,235,489 | Rath | Mar. 18, 1941 |
| 2,251,540 | Bushbeck | Aug. 5, 1941 |
| 2,270,872 | Golde et al. | Jan. 27, 1942 |
| 2,277,733 | Wainer et al. | Mar. 31, 1942 |
| 2,277,734 | Wainer et al. | Mar. 31, 1942 |
| 2,277,736 | Wainer | Mar. 31, 1942 |
| 2,283,705 | Stewart | May 19, 1942 |
| 2,289,211 | Ridgway | July 7, 1942 |
| 2,322,214 | Kirkwood et al. | June 22, 1943 |
| 2,335,714 | Voightmann | Nov. 30, 1943 |
| 2,360,479 | Detrick | Oct. 17, 1944 |

FOREIGN PATENTS

| Number | Country | Date |
|---|---|---|
| 147,433 | Great Britain | July 7, 1920 |
| 165,052 | Great Britain | Dec. 28, 1921 |
| 169,136 | Great Britain | Oct. 20, 1921 |
| 330,268 | Great Britain | June 4, 1930 |
| 449,882 | Great Britain | July 6, 1936 |
| 466,388 | Great Britain | May 27, 1937 |
| 467,443 | Great Britain | June 16, 1937 |
| 512,700 | Great Britain | Sept. 22, 1939 |
| 840,209 | France | Jan. 11, 1939 |
| 849,842 | France | Oct. 28, 1939 |

OTHER REFERENCES

Handbook of Chemistry and Physics, 26th ed., 1942–43, publ. by Chemical Rubber Publ. Co., 2310 Superior Ave., Cleveland, Ohio, pages 476–77. (Copy in Div. 15.)